Nov. 18, 1924.
O. H. GOETZ
1,515,734
AUTOMOBILE FENDER GUARD
Filed Aug. 25, 1924
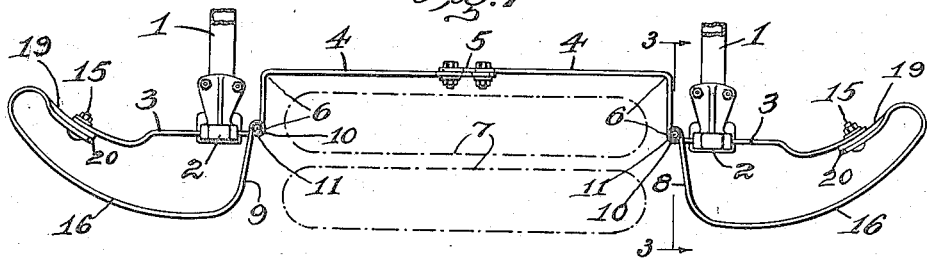
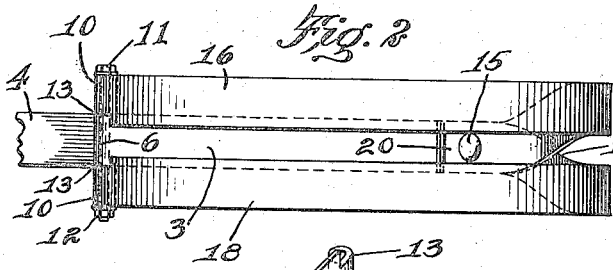
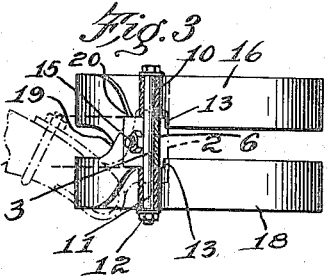
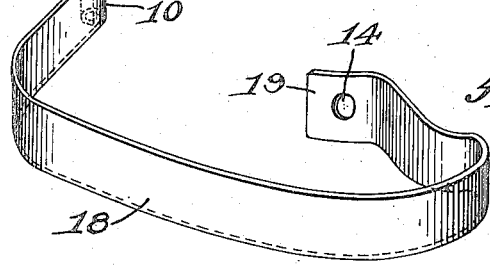
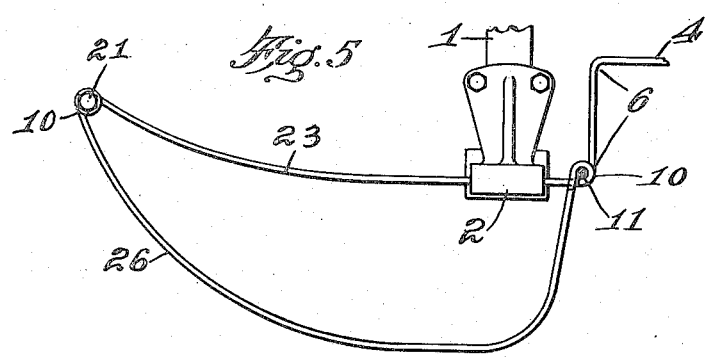
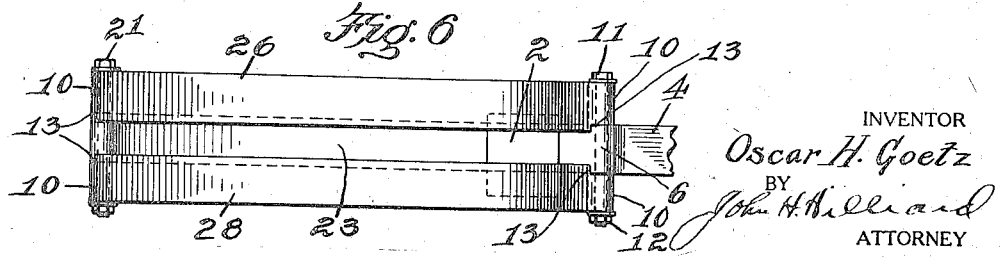
INVENTOR
Oscar H. Goetz
BY
John H. Hilliard
ATTORNEY Patented Nov. 18, 1924.

1,515,734

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE FENDER GUARD.

Application filed August 25, 1924. Serial No. 734,066.

*To all whom it may concern:*

Be it known that I, OSCAR H. GOETZ, a citizen of the United States, residing at Bridgeport, in the county of Fairfield, State of Connecticut, United States of America, have invented certain new and useful Improvements in Automobile Fender Guards, of which the following, taken in connection with the accompanying drawing, is a specification.

This invention relates to automobile bumpers, and more particularly to bumper "tips" or guards for the rear fenders of automobiles, and its object is to provide a bumper to be mounted at the rear of a car on suitable brackets, and having a tip or fender guard at each side comprising main bars of resilient strip steel superimposed one above the other preferably in vertical alignment, said bumper having also an attaching bar or bars extending entirely across the rear of the car between clamping devices or brackets preferably secured to the horns or rear-end portions of the longitudinal frame members of the automobile, said rear bar being offset toward the chassis to form a pocket to receive the spare tires.

Another object is to provide improved means for connecting the pairs of "tips" or fender guards to such a rear attaching bar, each of the superimposed bars being connected to said rear bar by a portion preferably at one end edge-bent into proximity with an end of the rear bar and bolted thereto, each pair of the members being connected further with the rear bar by eyes transfixed by bolts embraced partly by the bar at the bends where the rear bar is offset toward the chassis, these eye-portions being notched to form shoulders seated against the transverse portions of the rear bar adjacent to the aforesaid offset portions on each side, so that a serviceable abutment is thus furnished for each of the bumper tips at the region of greatest rigidity of the attaching member, viz., adjacent to its several connections with the clamping brackets mounted upon the horns of the frame.

Referring to the drawings:

Figure 1 is a top view of a somewhat diagrammatic character showing a bumper embodying the invention, with the brackets for supporting the same, and spare tires indicated by dotted lines in the space provided therefor.

Figure 2 is a face view on an enlarged scale of the right-hand bumper tip, or fender guard, illustrating the component bar portions with their connections.

Figure 3 is a vertical section on the line 3—3 of Figure 1. Figure 4 is a perspective of one of the bumper tips, isolated.

Figures 5 and 6 are respectively views in plan and elevation of a modification illustrating a pivotal connection with the attaching bar at each end of the several bumper tips.

In the illustrated embodiment, the reference character 1 designates the conventional rear end-portions or horns of the longitudinal frame members of an automobile, having clamping members or brackets 2 mounted thereon to receive and support the portions 3 of an auxiliary bumper-bar 4, serving as an attaching bar, and if desirable these latter parts 4 may be formed separately and united by an adjustable bolt-and-slot connection 5 at the middle region of the rear bar, this middle portion of the attaching bar being offset on each side of the frame, as indicated at 6, for example, to provide a pocket for the spare tires 7, the latter being indicated in dotted lines as embraced and protected on three sides by the bar portions 4, 5, and 6, and by the bumper tips or fender guards 8 and 9.

The latter are preferably formed respectively each with an eye 10 at one end to receive a bolt 11 having a nut 12, and which stands, thus supported, within the bend 6, and each eye-portion is notched at 13, to accommodate the extension therethrough of the part 3 of the attaching member, which is clamped at 2 as already described and is provided at its free end with a bolt 15 to serve as a support for the upper main rear bumper members 16, and likewise for the lower main rear bumper members 18. One of the latter members 18 is shown in perspective in Figure 4, isolated, with its end 19 edge-bent upwardly to bring the hole 14 into registry with the connecting bolt 15, and the end 20 of the upper bar 16 is similarly edge-bent downwardly to permit similar connection with the bolt 15, which unites the parts 3, 19 and 20 firmly in a strong lap joint.

The tips 16 and 18 may be readily removed from the attaching bar portions 3 and 4 in place, so that it is not necessary to disturb the spare tires or the clamps 2 in effecting a replacement of the tips or a repair thereof.

A similar case of removal and adjustment characterizes the modified structure illustrated in Figures 5 and 6, in which a vertical bolt 21 forms the connection between the attaching member 23 and the outer ends of the tip members 26 and 28 which are respectively provided with eyes 10 at both ends, instead of at the inner end only as in the structure described with reference to Figures 1 to 4 inclusive. The parts bearing the reference characters 1, 2, 4, 6, 10, 11 and 13 in Figures 5 and 6 are preferably identical in general structure and function with the similarly designated parts already described.

Having thus described my invention, I claim:

1. An automobile bumper comprising a pair of fender-guards joined together, and supported, by a bar to be secured to the automobile frame, the intermediate portion of said bar being offset toward the chassis to form a pocket for a spare tire.

2. An automobile bumper comprising a pair of fender-guards joined together, and supported, by a bar to be secured to the automobile frame by suitable fastening devices, spaced apart, the intermediate portion of said bar being offset toward the chassis to form a pocket for a spare tire.

3. An automobile bumper comprising a pair of fender-guards joined together, and supported, by a bar to be secured to the automobile frame, the intermediate portion of said bar being offset toward the chassis to form a pocket for a spare tire, each of said fender-guards comprising a pair of superimposed bumper bars having portions edge-bent to meet a portion of said rear bar and connected therewith.

4. An automobile bumper comprising a pair of fender-guards joined together, and supported, by a bar to be secured to the automobile frame, the intermediate portion of said bar being offset toward the chassis to form a pocket for a spare tire, each of said fender-guards comprising a pair of superimposed bumper bars having portions edge-bent into proximity with a portion of said middle bar and connected therewith by a bolt, the other ends of said bumper bars being respectively provided with eyes fitted to a bolt standing within a bend forming part of the offset portion of said middle bar and said eye-portions being respectively notched to accommodate said eye-portions to the bend in said middle bar.

In witness whereof I have signed this specification.

OSCAR H. GOETZ.